(No Model.)
C. F. BLACK.
DISH CLEANER.
No. 538,723. Patented May 7, 1895.
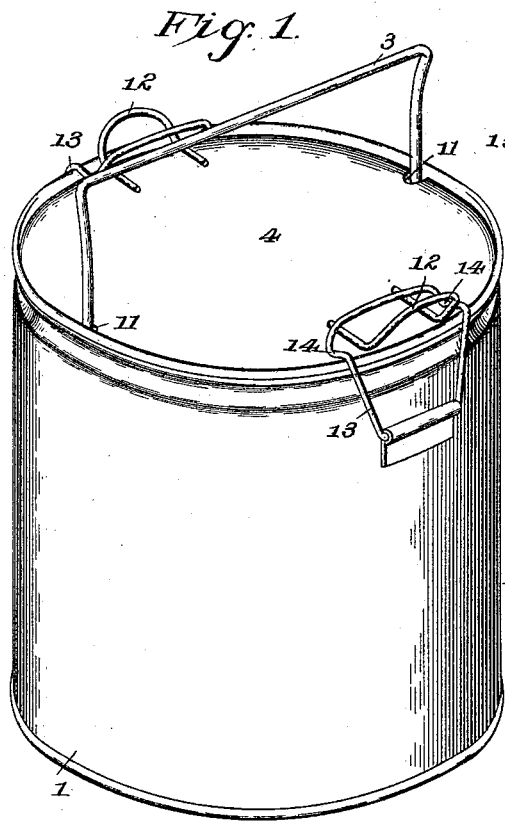
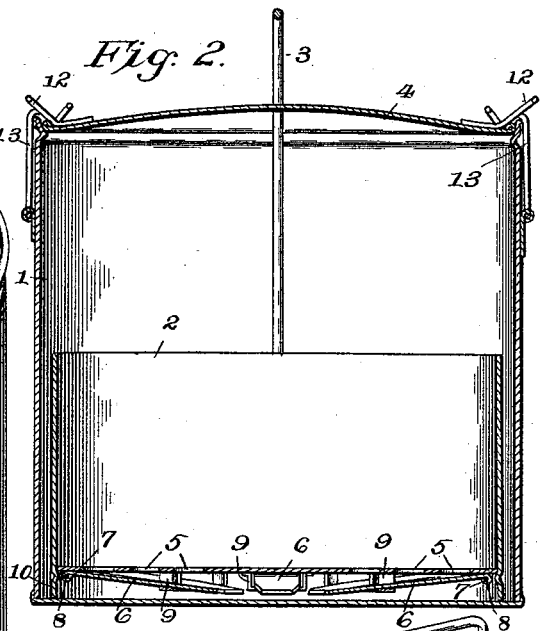
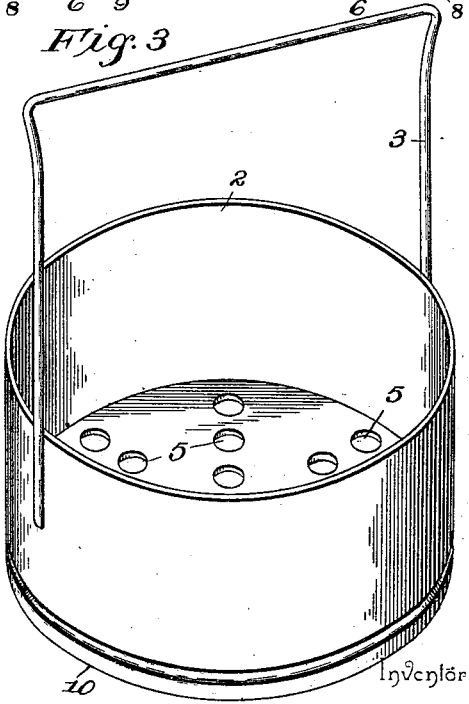
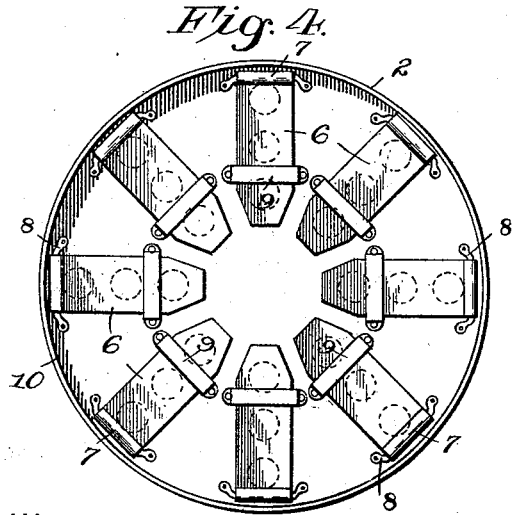
Witnesses
Chas. A. Ford
J. F. W. Riley
Inventor
Charles F. Black,
By his Attorneys,
C. A. Snow & Co.

UNITED STATES PATENT OFFICE.

CHARLES F. BLACK, OF TOPEKA, INDIANA.

DISH-CLEANER.

SPECIFICATION forming part of Letters Patent No. 538,723, dated May 7, 1895.

Application filed November 30, 1894. Serial No. 530,407. (No model.)

*To all whom it may concern:*

Be it known that I, CHARLES F. BLACK, a citizen of the United States, residing at Topeka, in the county of La Grange and State of Indiana, have invented a new and useful Dish-Washer, of which the following is a specification.

The invention relates to improvements in dish washers.

The object of the present invention is to improve the construction of dish washers, and to provide a simple and inexpensive one, which will enable dishes to be quickly washed at the expenditure of a minimum amount of labor, and which will necessitate but a small quantity of hot water for the operation of washing, thereby lessening the quantity of fuel employed in maintaining the washer in a heated condition, or for heating the water, and also lessening the labor in manipulating the washer.

The invention consists in the construction and novel combination and arrangement of parts hereinafter fully described, illustrated in the accompanying drawings, and pointed out in the claim hereto appended.

In the drawings, Figure 1 is a perspective view of a dish-water constructed in accordance with this invention. Fig. 2 is a central vertical sectional view of the same. Fig. 3 is a detail perspective view of the dish-receiving tray. Fig. 4 is a reverse plan view of the same.

Like numerals of reference indicate corresponding parts in all the figures of the drawings.

1 designates a cylindrical boiler or receptacle for hot water, having arranged within it a cylindrical dish-receiving tray 2, conforming to the configuration of the casing or receptacle 1, and provided with a rectangular bail or handle 3, extending upward from opposite sides of the tray, and projecting above the cover 4 of the outer receptacle or casing.

The cylindrical dish receiving tray is adapted to be moved vertically within the outer receptacle or casing to raise and lower its contents, and to subject the dishes to the action of the water. The bottom of the tray is provided with radial series of openings 5, and has mounted on its lower face an annular series of radial flap valves 6, hinged at their outer ends, and adapted to close the openings at the downward stroke or movement of the tray in the casing, or outer receptacle, to cause the water contained therein to flow over the top of the tray upon the dishes contained therein; and the valves are adapted to uncover the openings on the upward stroke or movement of the tray to permit the escape of water through the openings, whereby the dishes are thoroughly subjected to the action of the hot water and suds. The valves are provided at their outer ends with eyes 7 receiving rectangular pintles 8, secured to the lower face of the bottom of the tray, and the inner ends of the valves are arranged in rectangular keepers 9, depending from the bottom of the tray, and limiting the downward swing of the valves and supporting the latter. The tray is provided at its bottom with a depending peripheral flange 10, forming a support for the tray and preventing the valves or the keepers from coming in contact with the bottom of the outer receptacle or casing.

The cover 4 is provided at diametrically opposite points with openings 11, arranged at its periphery for the reception of the sides of the rectangular bail or handle of the tray; and it also has at opposite sides rigid outward projecting handles 12, which are engaged by swinging bails 13 hinged to opposite sides of the outer receptacle or casing, and arranged to swing upward over the rigid handles of the cover. The upward swinging handles or bails of the outer receptacle have inwardly offset upper portions formed by rectangular bends 14, which engage the upper edges of the body portion of the outer receptacle or casing, whereby they are retained in operative position. The rectangular bail or handle of the tray projects sufficiently above the cover to enable the tray to be conveniently operated, and the cover fits closely on the body portion of the outer receptacle, to prevent the operator from being splashed with hot water.

It will be seen that the dish-washer is exceedingly simple and inexpensive in construction, and that it is capable of enabling dishes to be rapidly washed, without the operator coming in contact with the hot water employed. It will also be apparent that the tray enables dishes to be readily inserted in and removed from the outer receptacle or casing.

Changes in the form, proportion, and the minor details of construction may be resorted to without departing from the principle or sacrificing any of the advantages of this invention.

What I claim is—

A dish-washer, comprising an outer receptacle or casing, a vertically movable tray arranged therein and provided with a series of radial openings at its bottom and having a depending supporting flange, an annular series of radial valves hingedly mounted on the lower face of the bottom of the tray adjacent to the periphery of the same and arranged to cover all of the openings thereof, a series of depending keepers mounted on the bottom of the tray and receiving the valves and supporting the same, and a handle or bail connected with the tray, substantially as described.

In testimony that I claim the foregoing as my own I have hereto affixed my signature in the presence of two witnesses.

CHARLES F. BLACK.

Witnesses:
LON D. FLEMING,
W. M. SMITH.